US011332176B1

(12) United States Patent
Lin et al.

(10) Patent No.: US 11,332,176 B1
(45) Date of Patent: May 17, 2022

(54) CART WITH CABINET CLOSURE

(71) Applicants: Joe Lin, Missouri City, TX (US); Brian Liu, Houston, TX (US)

(72) Inventors: Joe Lin, Missouri City, TX (US); Brian Liu, Houston, TX (US)

( * ) Notice: Subject to any disclaimer, the term of this patent is extended or adjusted under 35 U.S.C. 154(b) by 263 days.

(21) Appl. No.: 16/678,623

(22) Filed: Nov. 8, 2019

(51) Int. Cl.
  *B62B 3/00* (2006.01)
  *B62B 5/06* (2006.01)

(52) U.S. Cl.
  CPC ............. *B62B 3/004* (2013.01); *B62B 5/06* (2013.01)

(58) Field of Classification Search
  CPC .................................. B62B 3/004; B62B 5/06
  See application file for complete search history.

(56) References Cited

U.S. PATENT DOCUMENTS

| | | | | |
|---|---|---|---|---|
| 2,917,094 A * | 12/1959 | Sullivan | ........... | B62B 3/1436 150/166 |
| 4,741,167 A * | 5/1988 | Wigley | ........... | B62B 5/0013 312/6 |
| 4,782,873 A * | 11/1988 | Messner | ........... | B25H 3/028 150/154 |
| 5,875,904 A * | 3/1999 | Vorstenbosch | ........ | B62B 3/003 211/180 |
| 6,123,346 A * | 9/2000 | Baldwin | ........... | B62B 3/008 280/47.16 |
| 6,820,878 B2 * | 11/2004 | Safari | ........... | A61B 50/18 16/114.1 |
| 6,843,488 B1 * | 1/2005 | Tseng | ........... | F16B 12/26 280/47.35 |
| 8,916,991 B2 * | 12/2014 | Petrick | ........... | G06F 1/266 307/31 |
| 10,427,702 B2 * | 10/2019 | Phillips | ........... | B62B 3/10 |
| 2001/0045718 A1 * | 11/2001 | Boirum | ........... | E04G 5/00 280/47.26 |
| 2006/0097489 A1 * | 5/2006 | Cheung | ........... | B62B 3/025 280/651 |
| 2011/0049843 A1 * | 3/2011 | Radlow | ........... | B62B 3/025 280/651 |
| 2011/0267782 A1 * | 11/2011 | Petrick | ........... | G06F 1/26 361/724 |
| 2013/0033014 A1 * | 2/2013 | Yang | ........... | B62B 3/10 280/47.35 |
| 2014/0190077 A1 * | 7/2014 | Burmann | ........... | B62B 3/02 47/66.1 |

(Continued)

*Primary Examiner* — Bryan A Evans
(74) *Attorney, Agent, or Firm* — John R Casperson

(57) ABSTRACT

One embodiment of the invention provides kit that can be used for closing off the volume between the top and bottom trays of a hand cart for more secure storage of items on the bottom tray. The kit comprises a first wall section, a second wall section, and a third wall section. The first wall section is generally flat. The second wall section has a first generally flat section and a second generally flat section connected by a corner section. The third wall section has a first generally flat section and a second generally flat section connected by a corner section, and a generally flat door section connected to the second generally flat section by a hinge. The kit preferably comprises a plurality of fastener pairs for attaching the wall sections to the angle-stock legs. Preferably, each fastener pair comprises a bolt and a nut, and the kit further comprises a bushing for each fastener pair.

17 Claims, 8 Drawing Sheets

(56) References Cited

U.S. PATENT DOCUMENTS

| | | | |
|---|---|---|---|
| 2015/0097348 A1* | 4/2015 | Steinfels | F16M 11/2092 |
| | | | 280/47.35 |
| 2015/0294525 A1* | 10/2015 | Broom | B62B 3/003 |
| | | | 221/1 |
| 2018/0111635 A1* | 4/2018 | Oltman | B25H 1/08 |
| 2018/0147716 A1* | 5/2018 | Gang | B62B 3/005 |
| 2019/0111956 A1* | 4/2019 | Phillips | B62B 3/10 |
| 2020/0216104 A1* | 7/2020 | Leblanc | B62B 3/022 |

\* cited by examiner

CART WITH CABINET CLOSURE

FIELD OF THE INVENTION

In one aspect, the invention relates to a rolling cart. In another aspect, the invention relates to a closure for a rolling cart. In a further aspect, the invention relates to a fastening system for attaching a closure to a rolling is cart.

BACKGROUND OF THE INVENTION

Assembled work carts are bulky items to keep in a sales inventory. Separately stocking easy-to assemble carts in boxed kits and easy-to-mount accessories for the carts in boxed kits saves in storage and offers customers the capability to easily customize a work cart to their needs.

OBJECTS OF THE INVENTION

It is an object of this invention to provide a cabinet closure system for a work cart that is easy to inventory, ship and mount to the cart.

It is another object of this invention to provide a work cart that is adapted for easy mounting of the cabinet closure system.

It is another object of this invention to provide a bushing to modify the cart to receive the cabinet closure system.

SUMMARY OF THE INVENTION

One embodiment of the invention provides a hand cart comprising a bottom tray, a top tray, legs having apertures connecting the bottom tray and the top tray, and casters supporting the bottom tray. The bottom and top trays are generally rectangular and have four corners. The aperture legs are four in number and formed from angle-stock. The legs connect the four corners of the bottom tray with the four corners of the top tray to form a rigid rectilinear structure. The casters are four in number are connected to the four corners of the bottom tray. They extend away from the top tray. Each of the angle-stock legs comprises an elongated first plate portion and an elongated second plate portion connected along a corner. The elongated first plate portion and the elongated second plate portion have parallel front and back faces. Each elongated plate portion defines at least one non-cylindrical aperture, preferably keyhole-shaped, extending therethrough generally normal to the front face and back face.

Another embodiment of the invention provides a kit that can be used for closing off the volume between the top and bottom trays of the just-described hand cart for more secure storage of items on the bottom tray.

The kit comprises a first wall section, a second wall section, and a third wall section. The first wall section is generally flat. The second wall section has a first generally flat section and a second generally flat section connected by a corner section. The third wall section has a first generally flat section and a second generally flat section connected by a corner section, and a generally flat door section connected to the second generally flat section by a hinge.

Including corners on the wall sections permits the closure to comprise only three separate pieces and facilitates installing the pieces on the work cart.

Another embodiment of the invention provides a bushing that can be used with the just described cart as well as with the kit. The bushing has a generally flat first end and an oppositely facing generally flat second end, a longitudinal axis, and a passage extending therethrough from the first end to the second end along the longitudinal axis. The bushing has a first end portion adjacent the first end and a second end portion adjacent the second end. The first end portion is of a larger dimension transverse to the longitudinal axis than the second end portion. The second end portion of the bushing has an upper portion and a lower portion. The upper portion of the second end portion of the bushing has a generally cylindrical peripheral surface and the lower portion of the second end portion of the bushing forms a pair of wall sections that extend downwardly from the upper portion of the second end portion of the bushing. The lower end of each wall section is chamfered. The passage extending from the first end to the second end of the bushing is generally rectangular in elevation view and is vertically elongated.

The bushing is well adapted to use with the previously described hand cart when the non-cylindrical apertures are keyhole shaped to assist in securing the wall sections to the cart.

DETAILED DESCRIPTION OF THE INVENTION

Figure 1:
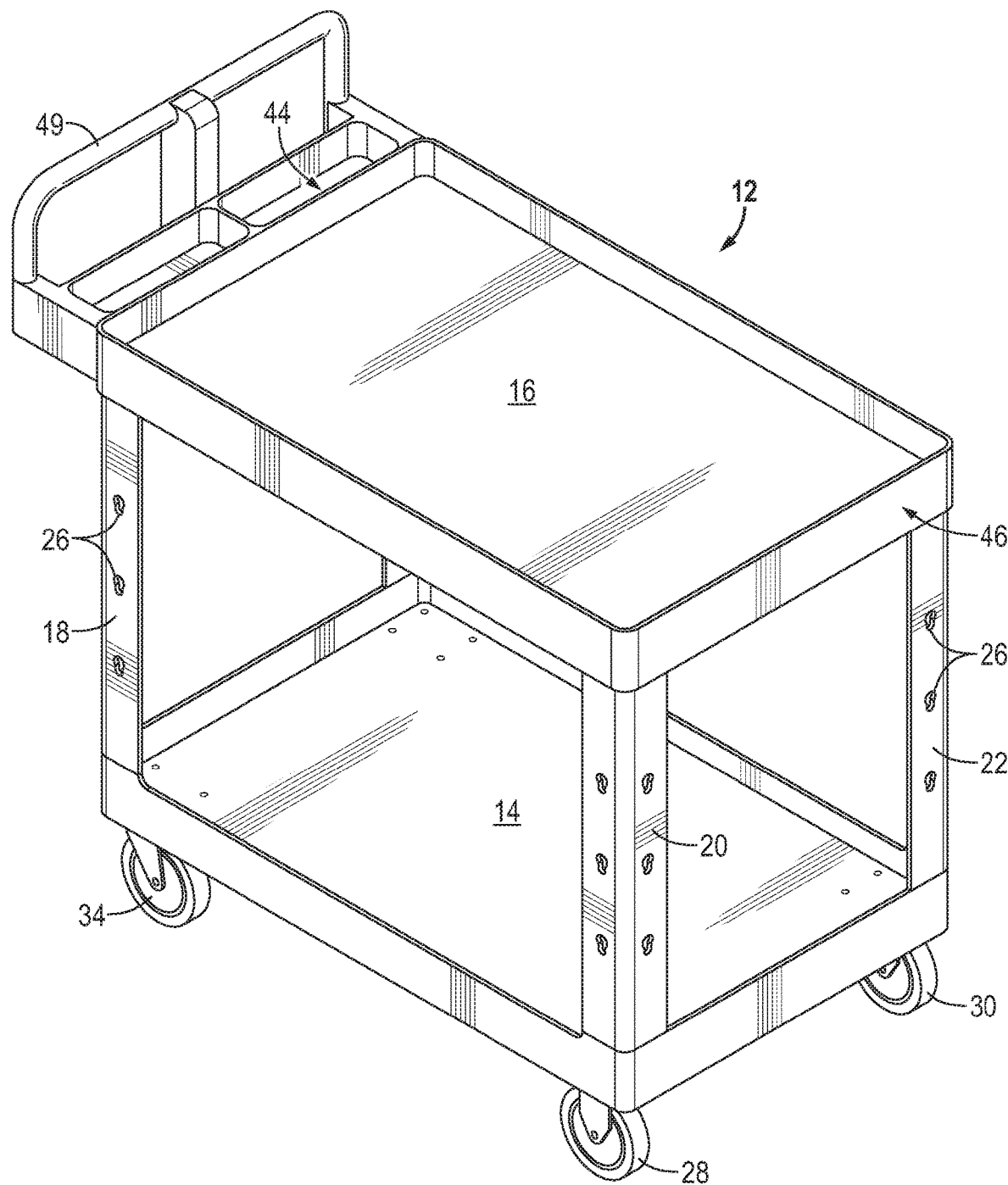
FIG. 1 is a pictorial view of a hand cart according to one embodiment of the invention.
Figure 2:
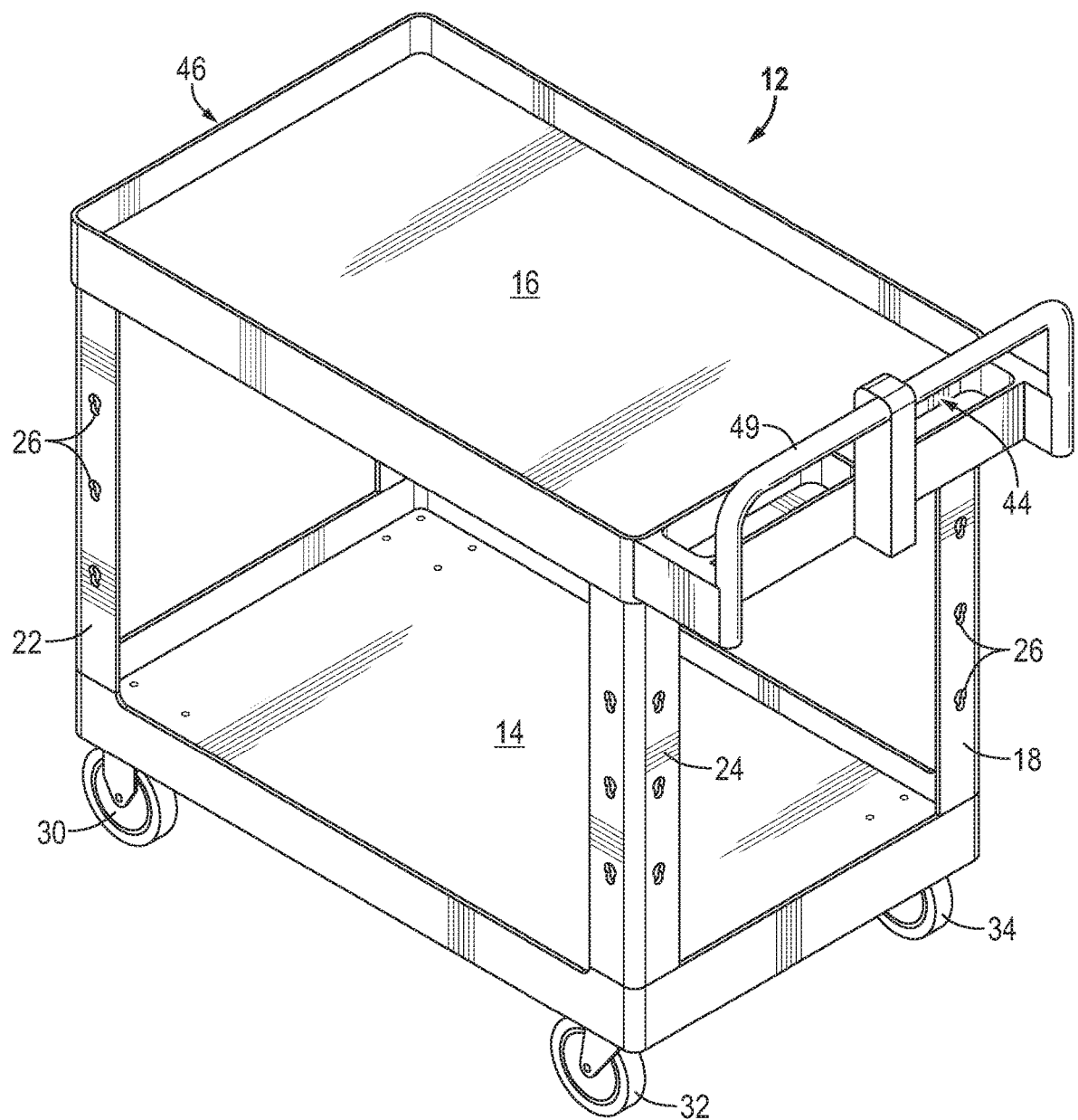
FIG. 2 is a reverse view of the hand cart shown in FIG. 1.
Figure 3:
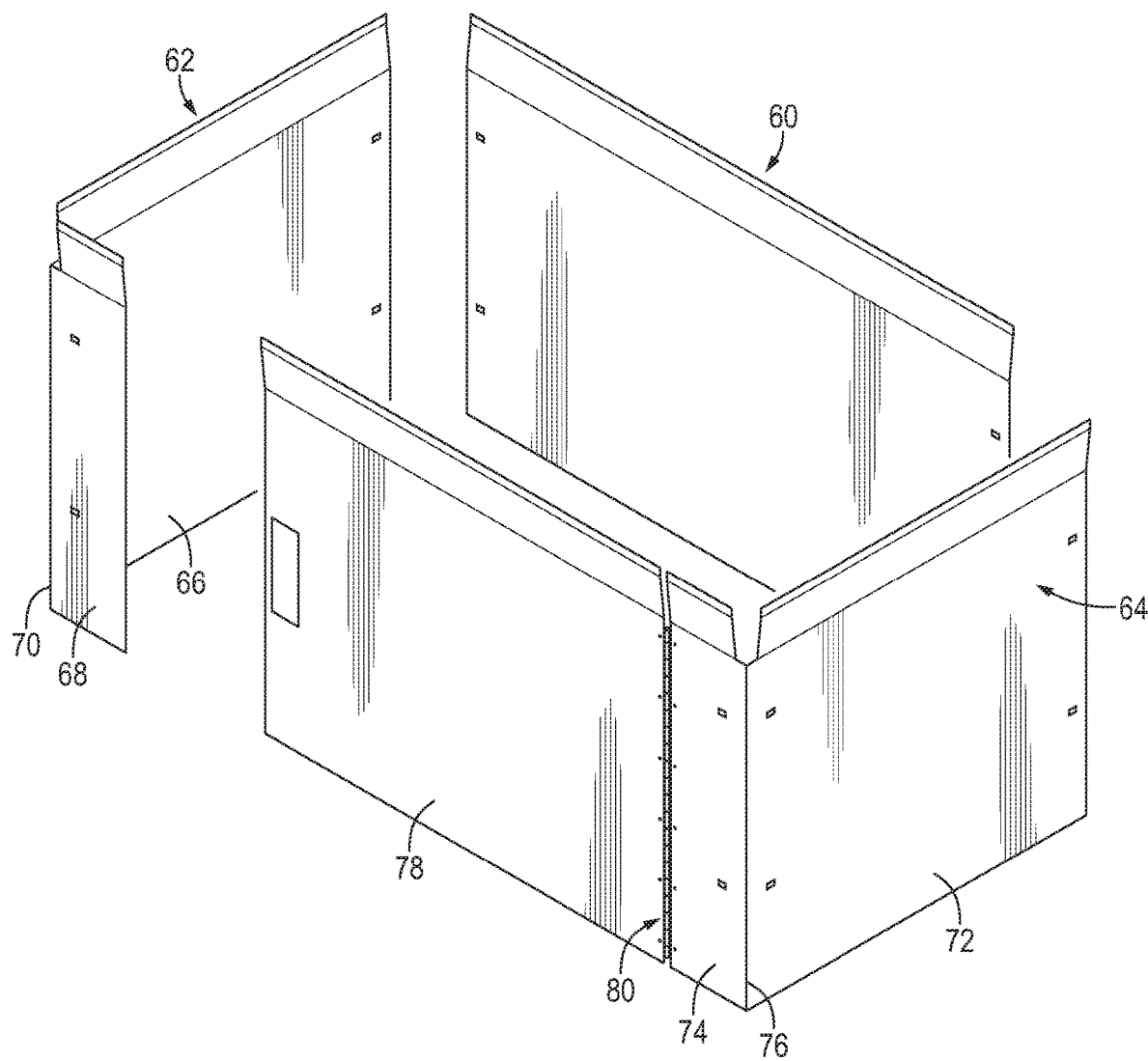
FIG. 3 is an exploded view of a kit to enclose a portion of the hand cart shown in FIGS. 1 and 2.
Figure 4:
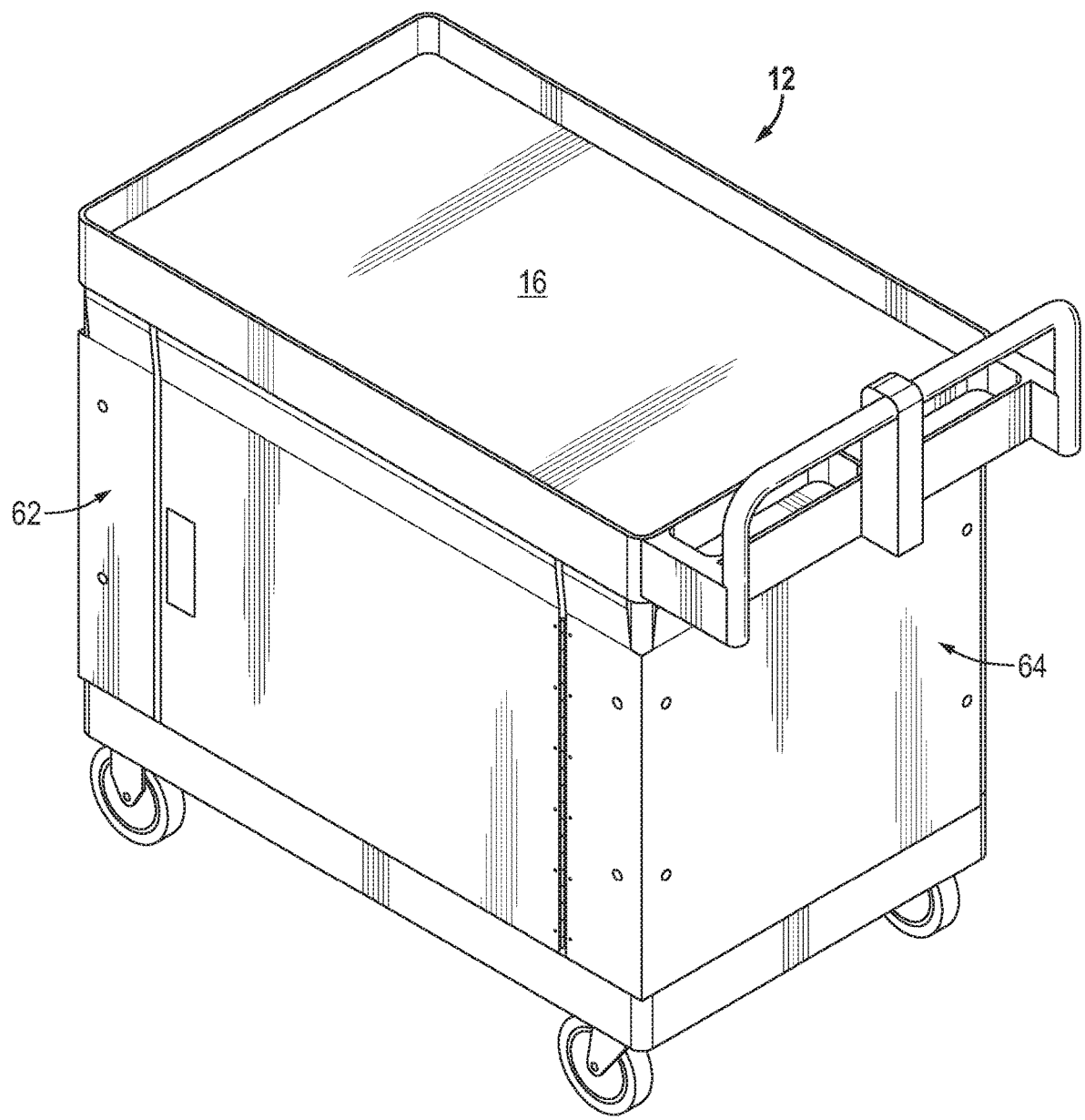
FIG. 4 is a pictorial view of a cart as in FIG. 2 onto which the kit of FIG. 3 has been installed.
Figure 5:
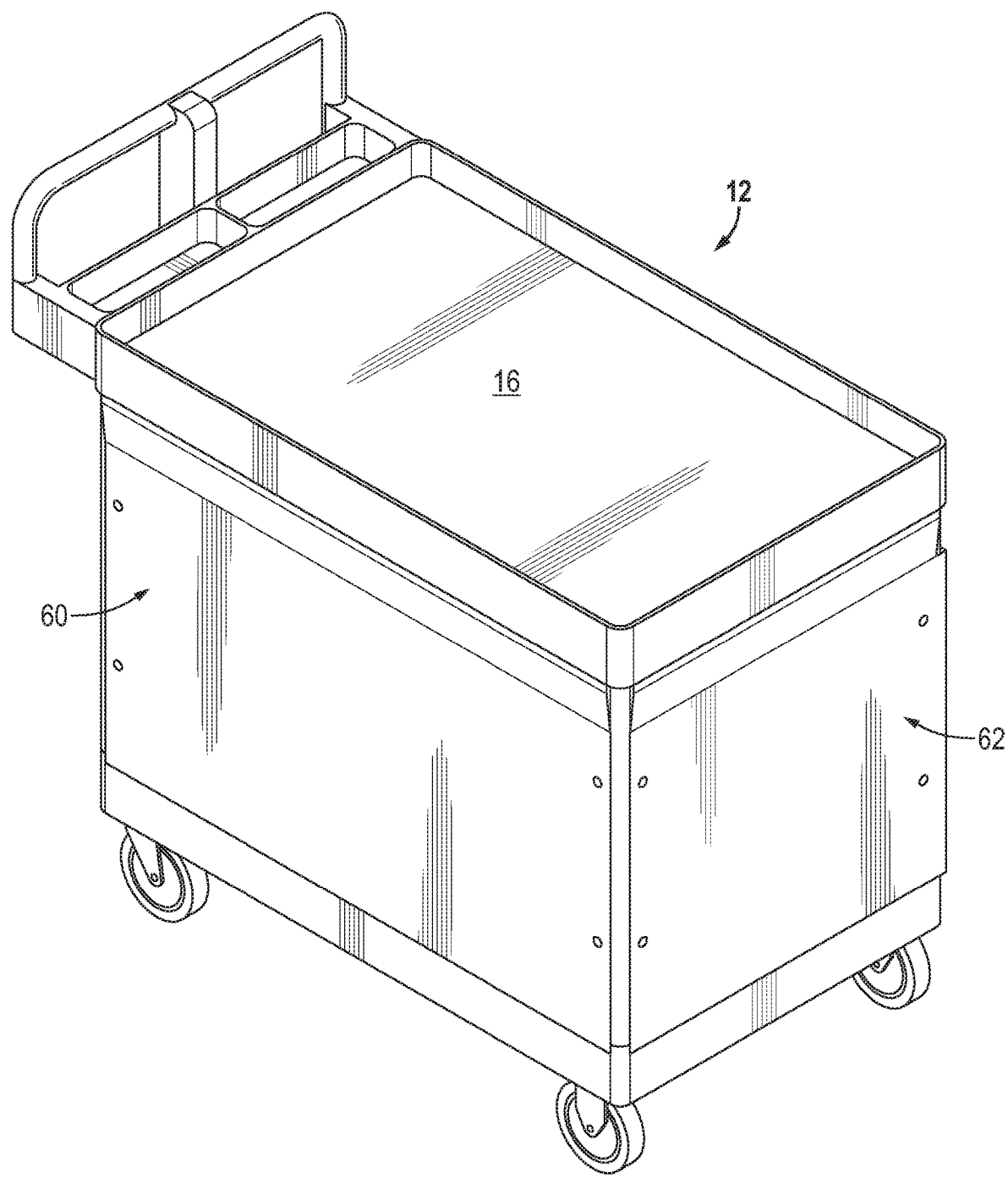
FIG. 5 is a reverse view of the cart of FIG. 4.
Figure 6:
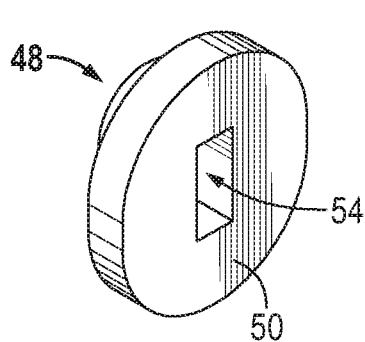
FIG. 6 is a pictorial view of a bushing for use with the carts of FIGS. 1-5 from a back side.
Figure 7:
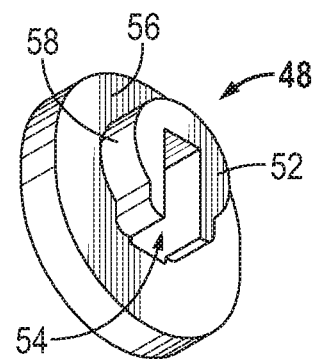
FIG. 7 is a view of the bushing of FIG. 6 from the front side.
Figure 8:
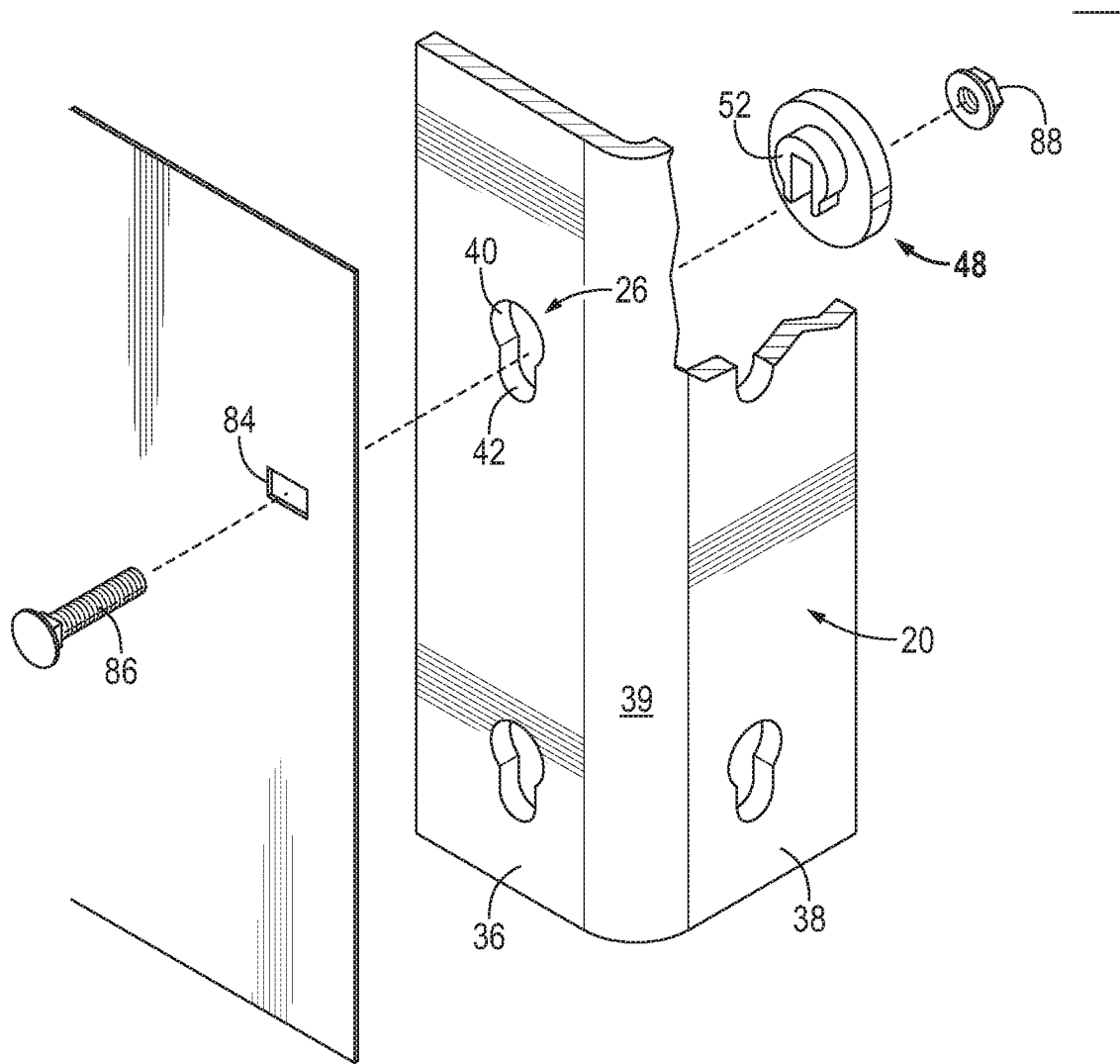
FIG. 8 is an exploded pictorial view of a portion of the cart shown in FIG. 4 and FIG. 5 showing construction details.

One embodiment of the invention provides a hand cart 12 comprising a bottom tray 14, a top tray 16, legs 18, 20, 22, 24 having apertures 26 connecting the bottom tray and the top tray, and casters 28, 30, 32, 34 supporting the bottom tray. The bottom and top trays are generally rectangular and have four corners. The apertured legs are four in number and formed from angle-stock. The legs connect the four corners of the bottom tray with the four corners of the top tray to form a rigid rectilinear structure. The casters are four in number are connected to the four corners of the bottom tray. They extend away from the top tray. Each of the angle-stock legs comprises an elongated first plate portion 36 and an elongated second plate portion 38 connected along a corner 39. The elongated first plate portion and the elongated second plate portion have parallel front and back faces. Each elongated plate portion defines at least one non-cylindrical aperture 26 extending therethrough generally normal to the front face and back face. In a preferred embodiment, each non-cylindrical aperture has an upper end and a lower end and is generally keyhole-shaped with a generally round hole 40 at the upper end and a slot 42 extending downwardly from the hole to the lower end.

Preferably, the top generally rectangular tray has a first end 44 and a second end 46. The hand cart further comprising a handle structure 49 attached to the first end of the top generally rectangular tray.

Also preferably, the top generally rectangular tray and the bottom generally rectangular tray each have peripheral side walls extending upwardly and downwardly from each of the top generally rectangular tray and the bottom generally rectangular tray. The peripheral side walls provide structural rigidity and a contact surface for the enclosing side walls when present. The bottom tray is accessible from an outside of the hand cart when the wall sections are not present. The trays and legs can be formed from any suitable material, but structural foam has been used with good results. For example, foamed polypropylene has been used with good results.

When desired, bushings provide structure to mount enclosing wall sections to the cart. Each bushing 48 preferably a generally flat first end 50 and an oppositely facing generally flat second end 52 and a passage 54 extending therethrough from the first end to the second end. The bushing has a first end portion 56 that won't pass through the at least one non-cylindrical aperture and a second end portion having a outside peripheral surface 58 that closely passes through an inside peripheral surface of the at least one non-cylindrical aperture. Each bushing is positioned in an aperture with the second end surface slightly protruding beyond the front face of a plate portion and the first end portion contacting the back face of the plate portion.

Figure 9:
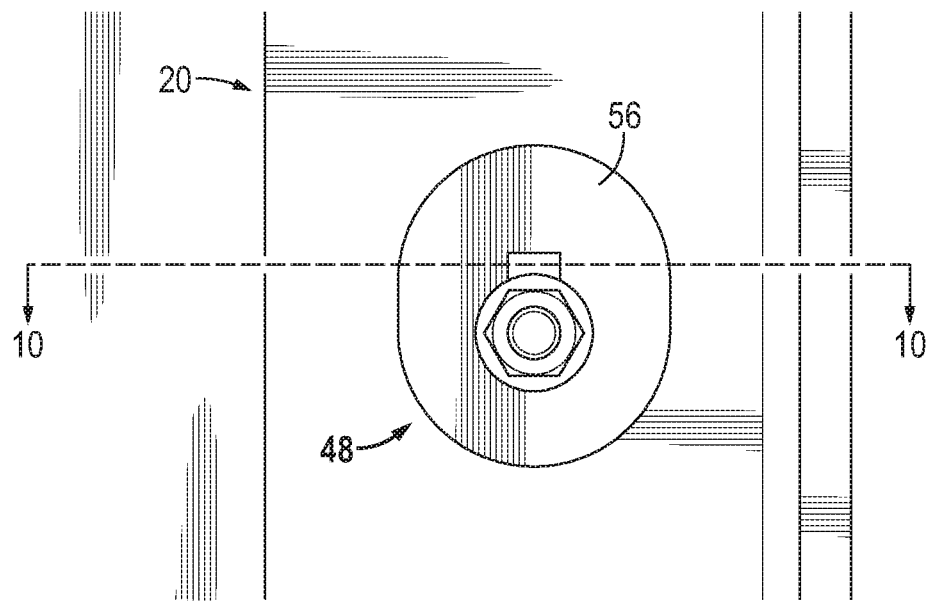
FIG. 9 is an elevation view of a portion of the cart shown in FIG. 4 and FIG. 5 showing design details.

In an embodiment which has been used with good results, each keyhole-shaped aperture, when viewed in elevation, has a generally circular upper portion and a generally rectangular lower portion extending radially downwardly from the generally circular upper portion. The apertures preferably taper toward the front face portion of the angle stock legs and the bushings contact the aperture walls at the narrowest point. Each bushing has a generally flat first end and an oppositely facing generally flat second end and a passage extending therethrough from the first end to the second end. The bushing has a first end portion that won't pass through the at least one non-cylindrical aperture and a second end portion having an outside peripheral surface that closely passes through an inside peripheral surface of the at least one non-cylindrical aperture. Each bushing is positioned in the at least one aperture with the second end surface slightly protruding above the front face of a plate portion and the first end portion contacts the back face of the plate portion. The second end portion of each bushing has an upper portion and a lower portion. The upper portion has a generally cylindrical peripheral surface fitting closely against the wall defining the circular upper portion of the aperture. The lower portion of the bushing comprises a pair of wall sections each having an upper end and a lower end extending downwardly from the upper portion and biasing against the pair of inside walls defining the generally rectangular portion of the keyhole shaped passage to frictionally and/or by interference fit hold the bushing in the passage. The lower end of each wall section is chamfered. The passage through each bushing is preferably generally rectangular in elevation view and is vertically elongated. The first end portion of each bushing has a generally oval shaped cross section and is vertically elongated. See FIG. 9. The legs of the bushings fit into the lower portions of the keyholes to retain the bushings in the keyholes and to orient the major axes of the rectangular passages through the bushings up and down.

A kit that can be separately manufactured, shipped and installed, to enclose the volume of a cart between the trays comprises a first wall section 60, a second wall section 62, and a third wall section 64 that can be attached to the four angle stock legs and to form a closure bounded by the upper tray, the lower tray, and the first, second and third wall sections, and the angle stock legs. The angle stock legs can have round or non-cylindrical apertures, so long as the bushings are sized to fit. The wall sections are preferably formed of sheet metal. In accordance with the invention, a four-sided closure for the cart can be formed from three wall section, and by keeping a wall section by the included corners narrow, the kit can be shipped in a relatively flat box.

In a preferred embodiment, the first wall section is generally flat. The second wall section has a first generally flat section 66 and a second generally flat section 68 connected by a corner section 70. The third wall section has a first generally flat section 72 and a second generally flat section 74 connected by a corner section 76, and a generally flat door section 78 connected to the second generally flat section by a hinge 80.

Figure 10:
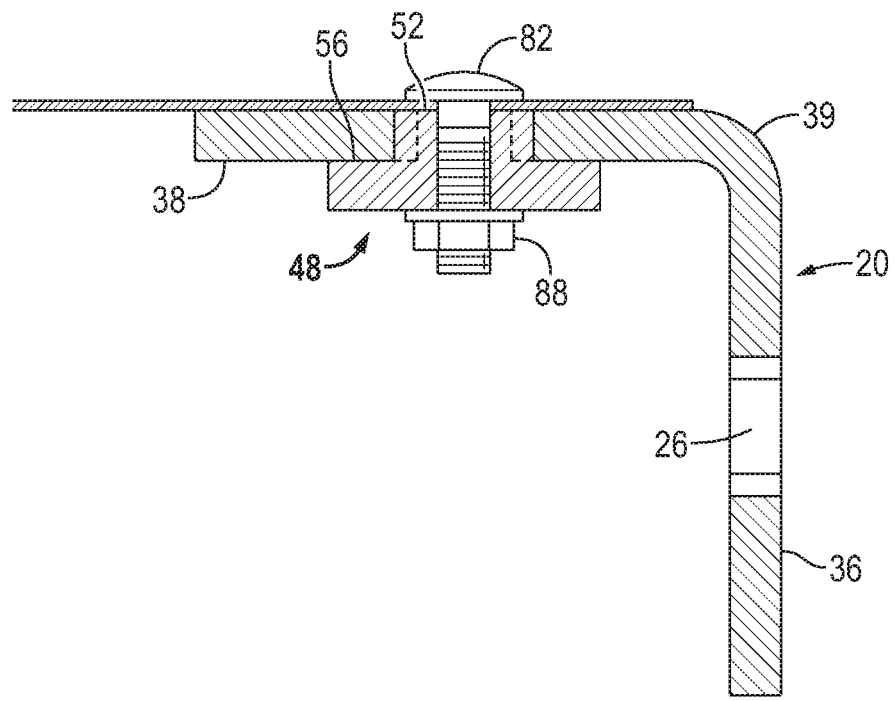
FIG. 10 is a cross-sectional view of the portion of the cart shown in FIG. 9 taken along lines 10-10 of FIG. 9.

Each wall section is attached to two angle-stock legs with fasteners 82. See FIG. 10. Preferably, each fastener passes through a passage 84 in the wall section and though a passage through a bushing positioned in a non-cylindrical aperture.

Preferably, each passage through the wall section is horizontally elongated and the passage through the bushing is vertically elongated. The fastener comprises a bolt 86 and a nut 88. The head of the bolt is urged against a wall section and the nut is urged against the first end portion of the bushing. An edge of the door section opposite the hinge closes against the second flat section of the second wall section.

Another embodiment of the invention provides kit that can be used for closing off the volume between the top and bottom trays of the just-described hand cart for more secure storage of items on the bottom tray. The kit comprises a first wall section, a second wall section, and a third wall section. The first wall section is generally flat. The second wall section has a first generally flat section and a second generally flat section connected by a corner section. The third wall section has a first generally flat section and a second generally flat section connected by a corner section, and a generally flat door section connected to the second generally flat section by a hinge. The kit preferably comprises a plurality of fastener pairs for attaching the wall sections to the angle-stock legs.

Preferably, each fastener pair comprises a bolt and a nut, and the kit further comprises a bushing for each fastener pair.

Another embodiment of the invention provides a bushing that can be used with the just described cart as well as the kit. The bushing has a generally flat first end and an oppositely facing generally flat second, a longitudinal axis, and a passage extending therethrough from the first end to the second end along the longitudinal axis. The bushing has a first end portion adjacent the first end and a second end portion adjacent the second end. The first end portion is of a larger dimension transverse to the longitudinal axis than the second end portion. The second end portion of the bushing has an upper portion and a lower portion. The upper portion of the second end portion of the bushing has a generally cylindrical peripheral surface and the lower portion of the second end portion of the bushing forms a pair of wall sections each having an upper end and a lower end that extend downwardly from the upper portion of the second end portion of the bushing. The lower end of each wall section is chamfered. The passage extending from the first end to the second end of the bushing is generally rectangular in elevation view and is vertically elongated. Preferably, the first end portion of the bushing has an oval shaped cross section and is vertically elongated to facilitate inserting the bushings into their receiving passages by hand.

Figure 11:
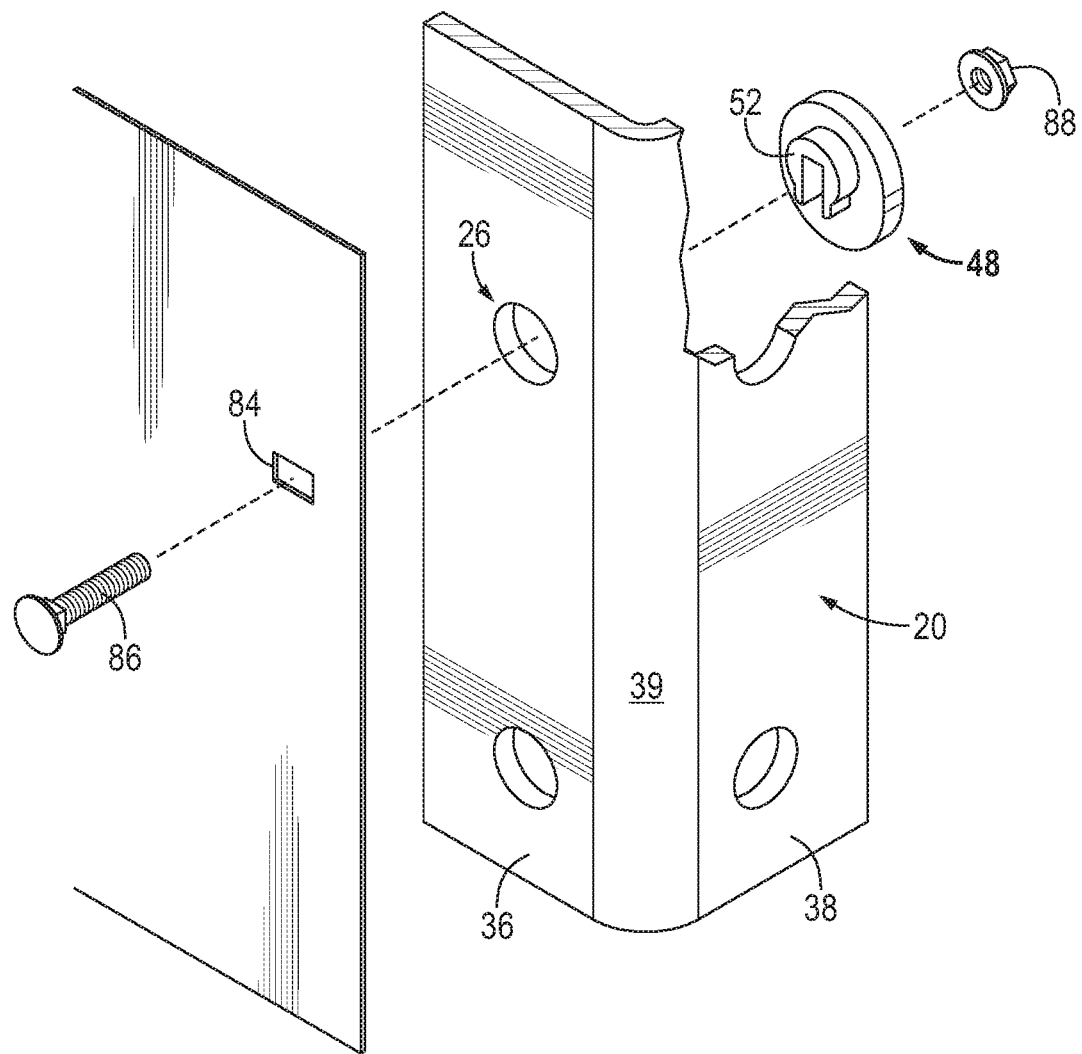
FIG. 11 is an exploded pictorial view of a portion of a cart similar to FIG. 8 but with round boreholes in the legs.

Another embodiment of the invention is illustrated in FIG. 11. The bushing 48 can be used to secure the wall sections to legs having round apertures 26 so long as the second end 52 of the bushing has a transverse dimension small enough to pass through the aperture. Preferably, the bushing fits snugly in the aperture and the second end 52 of the bushing has a longitudinal dimension slightly greater than the thickness of the leg plate portion 36 so that the wall section will pull up close to the leg.

While certain preferred embodiments have been described herein, the invention is not to be construed as being so limited, except to the extent that such limitations are found in the claims.

What is claimed is:

1. A hand cart comprising
a bottom generally rectangular tray having four corners;
a top generally rectangular tray having four corners;
four angle-stock legs connecting the four corners of the bottom tray with the four corners of the top tray forming a rigid generally rectilinear structure; and
four casters connected to the four corners of the bottom tray extending away from the top tray;
wherein
each angle-stock leg comprises an elongated first plate portion and an elongated second plate portion connected along a corner, said elongated first plate portion and said elongated second plate portion having parallel front and back faces,
wherein each elongated plate portion defines at least one non-cylindrical aperture extending therethrough generally normal to the front face and back face,
wherein
each non-cylindrical aperture has an upper end and a lower end and is generally keyhole-shaped with a generally round hole at the upper end and a slot extending downwardly from the hole to the lower end.

2. A hand cart as in claim 1 wherein the top generally rectangular tray has a first end and a second end, said hand cart further comprising a handle structure attached to the first end of the top generally rectangular tray.

3. A hand cart as in claim 1 wherein the top generally rectangular tray and the bottom generally rectangular tray each have peripheral side walls extending upwardly and downwardly from each of the top generally rectangular tray and the bottom generally rectangular tray, the bottom tray being accessible from an outside of the hand cart.

4. A hand cart as in claim 1 further comprising a bushing having a generally flat first end and an oppositely facing generally flat second end and a passage extending therethrough from the first end to the second end, said bushing having a first end portion that won't pass through the at least one non-cylindrical aperture and a second end portion having a outside peripheral surface that closely passes through an inside peripheral surface of the at least one non-cylindrical aperture, said bushing being positioned in the at least one aperture with the second end surface slightly protruding above the front face of a plate portion and the first end portion contacting the back face of the plate portion.

5. A hand cart as in claim 1 wherein each keyhole-shaped passage, when viewed in elevation, has a generally circular upper portion and a generally rectangular lower portion extending radially downwardly from the generally circular upper portion, said passage narrowing from back face to front face,
said hand cart further comprising
a bushing having a generally flat first end and an oppositely facing generally flat second end and a passage extending therethrough from the first end to the second end, said bushing having a first end portion that won't pass through the at least one non-cylindrical aperture and a second end portion having an outside peripheral surface that closely passes through an inside peripheral surface of the at least one non-cylindrical aperture, said bushing being positioned in the at least one aperture with the second end surface slightly protruding past the front face of a plate portion and the first end portion contacting the back face of the plate portion, wherein the second end portion of the bushing has an upper portion and a lower portion, the upper portion having a generally cylindrical peripheral surface fitting closely against the inside wall defining the upper portion of the aperture, the lower portion of the bushing comprising a pair of wall sections each having an upper end and a lower end and tapering from the upper end to the lower end extending downwardly from the upper portion and biasing against the pair of inside walls defining the generally rectangular portion of the keyhole shaped passage to frictionally and/or by interference fit hold the bushing in the passage.

6. A hand cart as in claim 5 wherein the passage is generally rectangular in elevation view and is vertically elongated.

7. A hand cart as in claim 6 wherein the first end portion has an oval shaped cross section and is vertically elongated.

8. A hand cart comprising
a bottom generally rectangular tray having four corners;
a top generally rectangular tray having four corners;
four angle-stock legs connecting the four corners of the bottom tray with the four corners of the top tray forming a rigid generally rectilinear structure; and
four casters connected to the four corners of the bottom tray extending away from the top tray;
wherein
each angle-stock leg comprises an elongated first plate portion and an elongated second plate portion connected along a corner, said elongated first plate portion and said elongated second plate portion having parallel front and back faces,
wherein each elongated plate portion defines at least one aperture extending therethrough generally normal to the front face and back face,
said hand cart further comprising
a first wall section, a second wall section, and a third wall section attached to the four angle stock legs and forming a closure bounded by the upper tray, the lower tray, and the first, second and third wall sections, and the angle stock legs,
wherein the first wall section is flat, the second wall section has a first flat section and a second flat section connected by a corner section, and the third wall section has a first flat section and a second flat section connected by a corner section, and a flat door section connected to the second flat section by a hinge.

9. A hand cart as in claim 8 wherein each wall section is attached to two angle-stock legs with fasteners.

10. A hand card as in claim 9 wherein each fastener passes through a passage in the wall section and though a passage through a bushing positioned in a non-cylindrical aperture in the leg.

11. A hand cart as in claim 10 wherein the aperture in the wall section is horizontally elongated and the passage through the bushing is vertically elongated, wherein the fastener comprises a bolt and a nut, wherein the head of the bolt is urged against a wall section and the nut is urged against the first end portion of the bushing.

12. A hand cart as in claim 9 wherein an edge of the door section opposite the hinge closes against the second flat section of the second wall section.

13. A hand cart as in claim 12 wherein the angle-stock legs are constructed of a foamed polymer material and the wall sections are constructed of sheet metal.

14. A kit for forming a closure around a hand cart
having a bottom generally rectangular tray having four corners,
a top generally rectangular tray having four corners, and
four angle-stock legs connecting the four corners of the bottom tray with the four corners of the top tray forming a rigid generally rectilinear structure;
said kit comprising:
a first wall section, a second wall section, and a third wall section,
wherein the first wall section is generally flat, the second wall section has a first generally flat section and a second generally flat section connected by a corner section, and the third wall section has a first generally flat section and a second generally flat section connected by a corner section, and a generally flat door section connected to the second generally flat section by a hinge.

15. A kit as in claim 14 wherein the wall sections are formed from sheet metal, said kit further comprising
a plurality of fastener pairs for attaching the wall sections to the angle-stock legs.

16. A kit as in claim 15 wherein each fastener pair comprises a bolt and a nut, said kit further comprising a bushing for each fastener pair.

17. A hand cart comprising
a bottom generally rectangular tray having four corners;
a top generally rectangular tray having four corners;
four angle-stock legs connecting the four corners of the bottom tray with the four corners of the top tray forming a rigid generally rectilinear structure; and
four casters connected to the four corners of the bottom tray extending away from the top tray;
wherein
each angle-stock leg comprises an elongated first plate portion and an elongated second plate portion connected along a corner, said elongated first plate portion and said elongated second plate portion having parallel front
wherein each elongated plate portion defines at least one aperture extending therethrough generally normal to the front face and back face,
said hand cart further comprising
a first wall section, a second wall section, and a third wall section attached to the four angle stock legs and forming a four-sided closure completely bounded by the upper tray, the lower tray, and the first, second and third wall sections, and the angle stock legs.

* * * * *